United States Patent
Kalika

(10) Patent No.: US 10,979,440 B1
(45) Date of Patent: Apr. 13, 2021

(54) PREVENTING SERVERLESS APPLICATION PACKAGE TAMPERING

(71) Applicant: Michael Kalika, Rishon Le-Tzion (IL)

(72) Inventor: Michael Kalika, Rishon Le-Tzion (IL)

(73) Assignee: Intuit Inc., Mountain View, CA (US)

( * ) Notice: Subject to any disclaimer, the term of this patent is extended or adjusted under 35 U.S.C. 154(b) by 249 days.

(21) Appl. No.: 16/116,332

(22) Filed: Aug. 29, 2018

(51) Int. Cl.
*H04L 29/06* (2006.01)
*H04L 9/32* (2006.01)
*G06F 8/61* (2018.01)

(52) U.S. Cl.
CPC .............. *H04L 63/126* (2013.01); *G06F 8/61* (2013.01); *H04L 9/3242* (2013.01); *H04L 9/3247* (2013.01)

(58) Field of Classification Search
CPC .... H04L 63/126; H04L 9/3247; H04L 9/3242
See application file for complete search history.

(56) References Cited

U.S. PATENT DOCUMENTS

| | | | | |
|---|---|---|---|---|
| 10,063,445 | B1* | 8/2018 | Preece | H04L 41/0863 |
| 2002/0138554 | A1* | 9/2002 | Feigen | H04L 63/123 |
| | | | | 709/203 |
| 2006/0123018 | A1* | 6/2006 | Ashok | G06F 8/61 |
| 2008/0065550 | A1* | 3/2008 | Zhu | H04L 63/0442 |
| | | | | 705/51 |
| 2010/0287547 | A1* | 11/2010 | Korkishko | H04W 12/0023 |
| | | | | 717/177 |
| 2015/0052402 | A1* | 2/2015 | Gurumurthy | G06F 11/3688 |
| | | | | 714/38.1 |
| 2015/0205949 | A1* | 7/2015 | Iskin | G06F 21/51 |
| | | | | 713/187 |
| 2018/0260301 | A1* | 9/2018 | Podjarny | G06F 16/2379 |
| 2019/0007458 | A1* | 1/2019 | Shulman | H04L 63/1433 |
| 2019/0121985 | A1* | 4/2019 | Hoole | G06F 11/362 |

OTHER PUBLICATIONS

T. Lynn, P. Rosati, A. Lejeune and V. Emeakaroha, "A Preliminary Review of Enterprise Serverless Cloud Computing (Function-as-a-Service) Platforms," 2017 IEEE International Conference on Cloud Computing Technology and Science (CloudCom), Hong Kong, 2017, pp. 162-169, doi: 10.1109/CloudCom.2017.15. (Year: 2017).*
Fox GC, Ishakian V, Muthusamy V, Slominski A. Status of serverless computing and function-as-a-service (faas) in industry and research. arXiv preprint arXiv: 1708.08028. Aug. 27, 2017. (Year: 2017).*

(Continued)

*Primary Examiner* — Robert B Leung
(74) *Attorney, Agent, or Firm* — Ferguson Braswell Fraser Kubasta PC

(57) ABSTRACT

A method that involves receiving, from a host server in a serverless computing architecture, a list of functions comprising a deployed function on the host server, wherein the functions execute within a function as a service (FaaS) platform; receiving validation data for each of the functions; executing a validation process for each of the functions using the validation data; and generating a validation alert in response to the deployed function failing the validation process.

15 Claims, 11 Drawing Sheets

(56) References Cited

OTHER PUBLICATIONS

G. McGrath and P. R. Brenner, "Serverless Computing: Design, Implementation, and Performance," 2017 IEEE 37th International Conference on Distributed Computing Systems Workshops (ICDCSW), Atlanta, GA, 2017, pp. 405-410, doi: 10.1109/ICDCSW.2017.36. (Year: 2017).*

Oracle Java Documentation, "Signing JAR Files"; The Java Tutorials; Trail: Deployment; Lesson: Packaging Programs in JAR Files; Section: Signing and Verifying JAR Files; <https://docs.oracle.com/javase/tutorial/deployment/jar/signing.html>; Accessed Sep. 10, 2018 (2 pages).

David Fischer, "Signing and Verifying Python Packages with PGP"; <https://www.davidfischer.name/2012/05/signing-and-verifying-python-packages-with-pgp/>; May 7, 2012; Accessed Sep. 10, 2018 (7 pages).

AWS Lambda, "UpdateFunctionCode"; Developer Guide, API References, Actions, UpdateFunctionCode; <https://docs.aws.amazon.com/lambda/latest/dg/API_UpdateFunctionCode.html#API_UpdateFunctionCode_RequestSyntax>; Accessed Sep. 10, 2018 (10 pages).

AWS Lambda, "ListFunctions"; Developer Guide, API References, Actions, ListFunctions; <https://docs.aws.amazon.com/lambda/latest/dg/API_ListFunctions_html>; Accessed Sep. 10, 2018 (5 pages).

\* cited by examiner

PREVENTING SERVERLESS APPLICATION PACKAGE TAMPERING

BACKGROUND

Computing platforms that are not under the complete control of the developer are vulnerable to security threats at both the integration and deployment phase of software development. A challenge is to ensure that the functions deployed to a computing platform have not been tampered with by hackers when complete control of the computing platform is not available.

SUMMARY

In general, in one or more aspects, the invention relates to a method that involves receiving, from a host server in a serverless computing architecture, a list of functions comprising a deployed function on the host server, wherein the functions execute within a function as a service (FaaS) platform; receiving validation data for each of the functions; executing a validation process for each of the functions using the validation data; and generating a validation alert in response to the deployed function failing the validation process.

In general, in one or more aspects, the invention relates to a system that comprises: a computer processor; a memory; a set of instructions in the memory that when executed by the computer processor cause the computer processor to perform: receiving, from a host server in a serverless computing architecture, a list of functions comprising a deployed function on the host server, wherein the functions execute within a function as a service (FaaS) platform; receiving validation data for each of the functions; executing a validation process for each of the functions using the validation data; and generating a validation alert in response to the deployed function failing the validation process.

In general, in one or more aspects, the invention relates to a non-transitory computer readable medium that comprises computer readable program code for: receiving, from a host server in a serverless computing architecture, a list of functions comprising a deployed function on the host server, wherein the functions execute within a function as a service (FaaS) platform; receiving validation data for each of the functions; executing a validation process for each of the functions using the validation data; and generating a validation alert in response to the deployed function failing the validation process.

Other aspects of the invention will be apparent from the following description and the appended claims.

DETAILED DESCRIPTION

Figure 1:
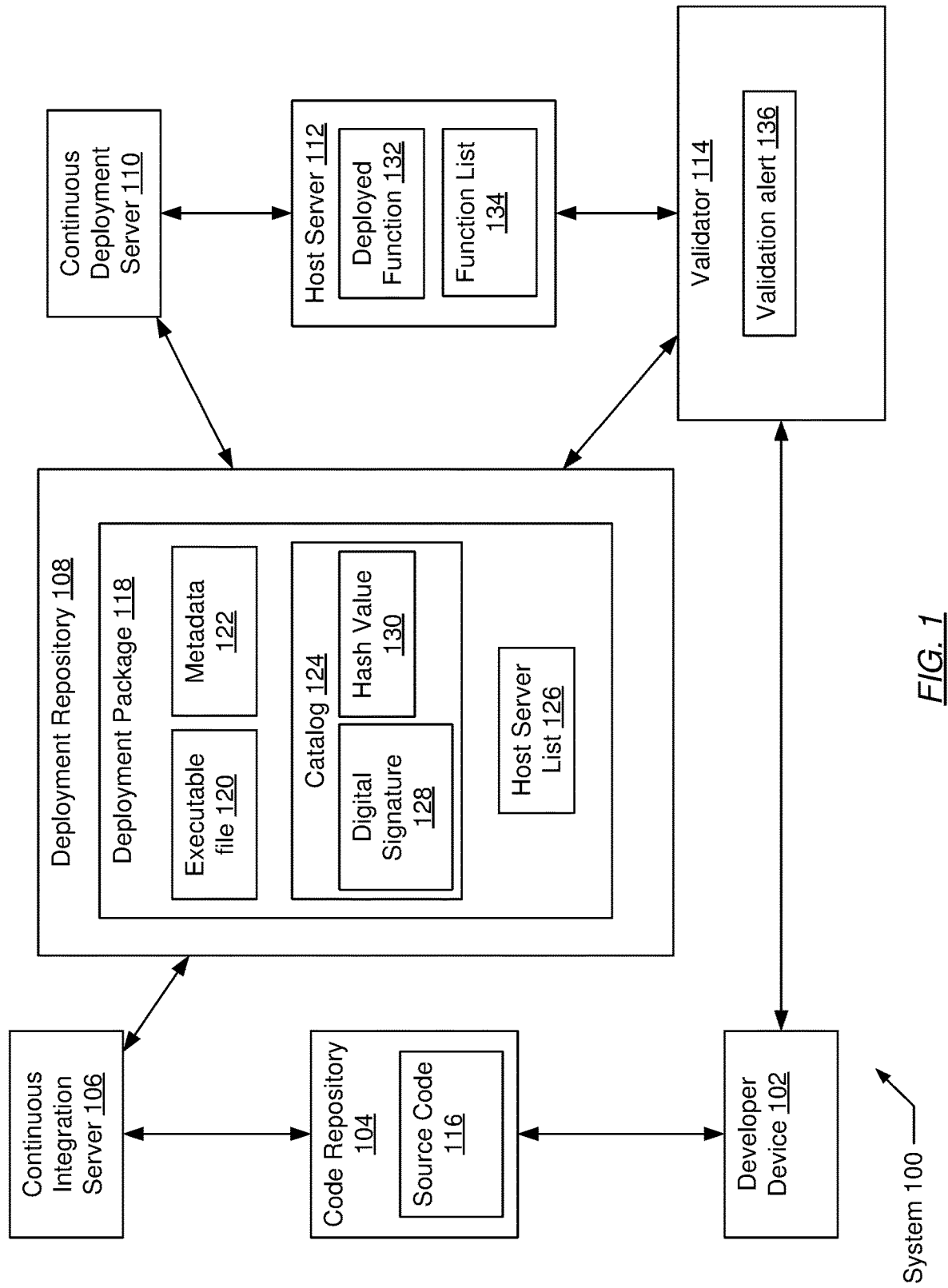
FIG. 1 shows a system in accordance with one or more embodiments of the present disclosure.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Serverless applications are applications where some amount of server-side logic is written by developers, but unlike traditional applications, the serverless applications run in stateless compute containers that are event-triggered, ephemeral (may only last for one invocation), and fully managed by a third party.

Serverless computing platforms, also referred to function as a service (FaaS) platforms, provide for event-driven applications and function deployment. Serverless computing platforms provide compute services that run code and execute functions in response to events. Serverless computing platforms can automatically manage the computer resources required by the code without the developer of the code managing the computer resources.

In general, embodiments of the invention detect and/or prevent serverless application package tampering. Packages that are deployed as functions in a function as a service platform (FaaS) using a serverless architecture can be tampered with before deployment and after deployment. Before deployment, tampering is detected by verifying the deployment package with a digital signature created from the deployment package. After deployment, tampering is detected by comparing a current hash value generated from the installed package (i.e., the deployed function), with an original hash value generated from the installed package immediately after installation. Tampering may also be detected after deployment by comparing a current hash value generated from the deployed function to a digital signature created from the deployment package. Validation and verification of the deployment package and the deployed function can be performed periodically (monthly, weekly, daily, hourly, etc.) or in response to events (e.g., source code update events, deployment package update events, server restart events, etc.).

FIG. 1 shows a diagram of a system (100) in accordance with one or more embodiments of the invention. The various components of the system (100) may correspond to the computing system shown in FIGS. 4A and 4B. In particular, the type, hardware, and computer readable medium for the various components of the system (100) is presented in reference to FIGS. 4A and 4B. The system (100) forms a serverless computing architecture that provides a function as a service platform within which functions can execute. The system (100) includes the developer device (102), the code repository (104), the continuous integration server (106), the deployment repository (108), the continuous deployment server (110), the host server (112), and the validator (114). In one or more embodiments, one or more of the components shown in FIG. 1 may be omitted, repeated, and/or altered as shown from FIG. 1. Accordingly, the scope of the present disclosure should not be considered limited to the specific arrangement of components shown in FIG. 1.

The developer device (102) is operated by a developer to interact with the system (100). In one or more embodiments, the developer device (102) is a computing system, such as a smartphone, tablet computer, desktop computer, server computer, etc. In one or more embodiments, the developer device (102) is used by the developer to generate the source code (116) that is transmitted to and stored in the code repository (104), as further described below. In one or more embodiments, the developer device (102) is used by the developer to receive, display, and respond to alerts, such as the validation alert (136) generated by the validator (114), which is further described below.

The code repository (104) receives and stores the source code (116). In one or more embodiments, the code repository (104) is a version control system operating on one or more physical servers and virtual servers. The code repository (104) tracks changes in the source code (116) and coordinates work on the source code (116) among multiple developers, including the developer using the developer device (102).

The source code (116) is a collection of instructions written using a programming language to perform the functions required by an application and executed as a function. In one or more embodiments, the source code (116) is transformed from human-readable text by an assembler or compiler into binary machine code that can be understood by the host server (112). Additional or alternative embodiments can have the source code be interpreted and directly executed by the host server (112) without the use of an assembler or compiler.

The continuous integration server (106) builds and tests the source code (116). In one or more embodiments, the continuous integration server (106) is an application operating on one or more physical servers and virtual servers. The continuous integration server (106) generates and transmits the deployment package (118) stored in the deployment repository (108) periodically by polling the code repository (104) or in response to events, which is further described below. The deployment package (118) is generated by the continuous integration server (106) based on the source code (116).

The deployment repository (108) stores a set of deployment packages including the deployment package (118), which is further described below. The deployment repository (108) also stores the catalog (124) and the host server list (126), which are further described below. In one or more embodiments, the deployment repository (108) is a database operating on one or more physical servers and virtual servers.

The deployment package (118) is a computer file that includes one or more executable files (e.g., executable file (120)), the metadata (122) for deploying the one or more executable files, the catalog (124), and the host server list (126), which are further described below. In one or more embodiments, the executable files are stored in an archive file in the deployment package (118).

In one or more embodiments, the executable file (120) includes a set of instructions generated from the source code (116) by the continuous integration server (106). The type of instructions depend on the type of programming language used and can contain binary code (generated from, e.g., assembly, C, C++, Go), byte code (from Java), high-level code (from Python, JavaScript), etc.

The metadata (122) describes the deployment package (118). For example, the metadata (122) specifies at least a version of the deployment package (118) and a list of dependencies for the deployment package (118). The list of dependencies identifies other packages or programs that need to be installed in order for the deployment package (118) to execute as a function on the host server (112).

The catalog (124) is a database that includes a set of digital signatures and a set of hash values for the deployment package (118).

For example, digital signature (128) is generated by the continuous integration server (106) by creating a message and encrypting the message with a private key. The message can include one or more hash values generated from one or more executable files, including executable file (120).

As another example, hash value (130) is a cryptographic hash value generated from the executable file (120). In one or more embodiments, the cryptographic hash value is generated using a hash algorithm, examples of which include message digest 5 (MD5), secure hash algorithms (SHA-0, SHA-1, SHA-2, SHA-3, SHA-256), RACE Integrity Primitives Evaluation Message Digest (RIPEMD), etc. The hash value (130) can be generated by the continuous integration server (106) after the executable files have been created. The cryptographic hash value (130) can also be generated by the host server (112) immediately after deployment of the deployment package (118) to the host server (112). The catalog (124) can store a hash value (including the hash value (130)) for each host server (including the host server (112)) to which the function is deployed and can store the hash value generated by the continuous integration server (106). If the same hashing algorithm is applied to the same executable files, then each hash file should match. The hash files generated by the host servers can include additional information that is unique to each host server so that each hash file will be distinct.

The host server list (126) identifies each host server (112) to which the deployment package (118) is deployed. In one or more embodiments, the host server list (126) is generated or updated by the continuous deployment server (110) after each deployment of the deployment package (118) to a host server (112).

The continuous deployment server (110) deploys the deployment package (118) from the deployment repository (108) to the host server (112) periodically by polling the deployment repository (108) or in response to events, which is further described below. In one or more embodiments, the continuous deployment server (110) is an application operating on one or more physical servers and virtual servers.

The host server (112) is part of a serverless computing architecture, which is a cloud-computing execution model in which the cloud provider that hosts the host server (112) dynamically manages the allocation of machine resources instead of the developer to deploy applications and functions. The host server (112) hosts the deployed function (132) and generates the function list (134). The deployed function (132) is one of a set of functions deployed on the host server (112) to execute within a function as a service (FaaS) platform. The deployed function (132) is deployed by installing the executable files (120) from the deployment package (118) onto the host server (112). In one or more embodiments, the host server (112) includes one or more physical servers and virtual servers.

The function list (134) is a list of the functions that have been deployed to the host server (112). Accordingly, the function list (134) identifies the deployed function (132). In one or more embodiments, the function list (134) also includes a hash value for one or more of the executable files (120) from the deployment package (118) that form the function (132) deployed on the host server (112). The hash value can be generated on demand in response to a request for the function list (134). Each executable file can have an individual hash value that is generated by applying a hashing algorithm to the executable file. Additional and alternative embodiments can generate additional hash values from the hash values generated for the individual executable files.

The validator (114) is an application that validates the deployed function (132) on the host server (112). In one or more embodiments, the validator (114) executes on its own server. Additionally or alternatively, the validator (114) may execute on the host server (112) or any other component in FIG. 1. The validator (114) generates the validation alert (136). The validation alert (136) identifies functions from the function list (134) that were not validated (e.g., failed a validation process) and thus have likely been tampered with.

In one or more embodiments of the invention, the code repository (104) and the deployment repository (108) is any type of storage unit and/or device (e.g., a file system, database, collection of tables, or any other storage mechanism) for storing data. Further, the repositories (104, 108) may include multiple different storage units and/or devices. The multiple different storage units and/or devices may or may not be of the same type or located at the same physical site.

While FIG. 1 shows a configuration of components, other configurations may be used without departing from the scope of the invention. For example, various components may be combined to create a single component. As another example, the functionality performed by a single component may be performed by two or more components.

Figure 2:
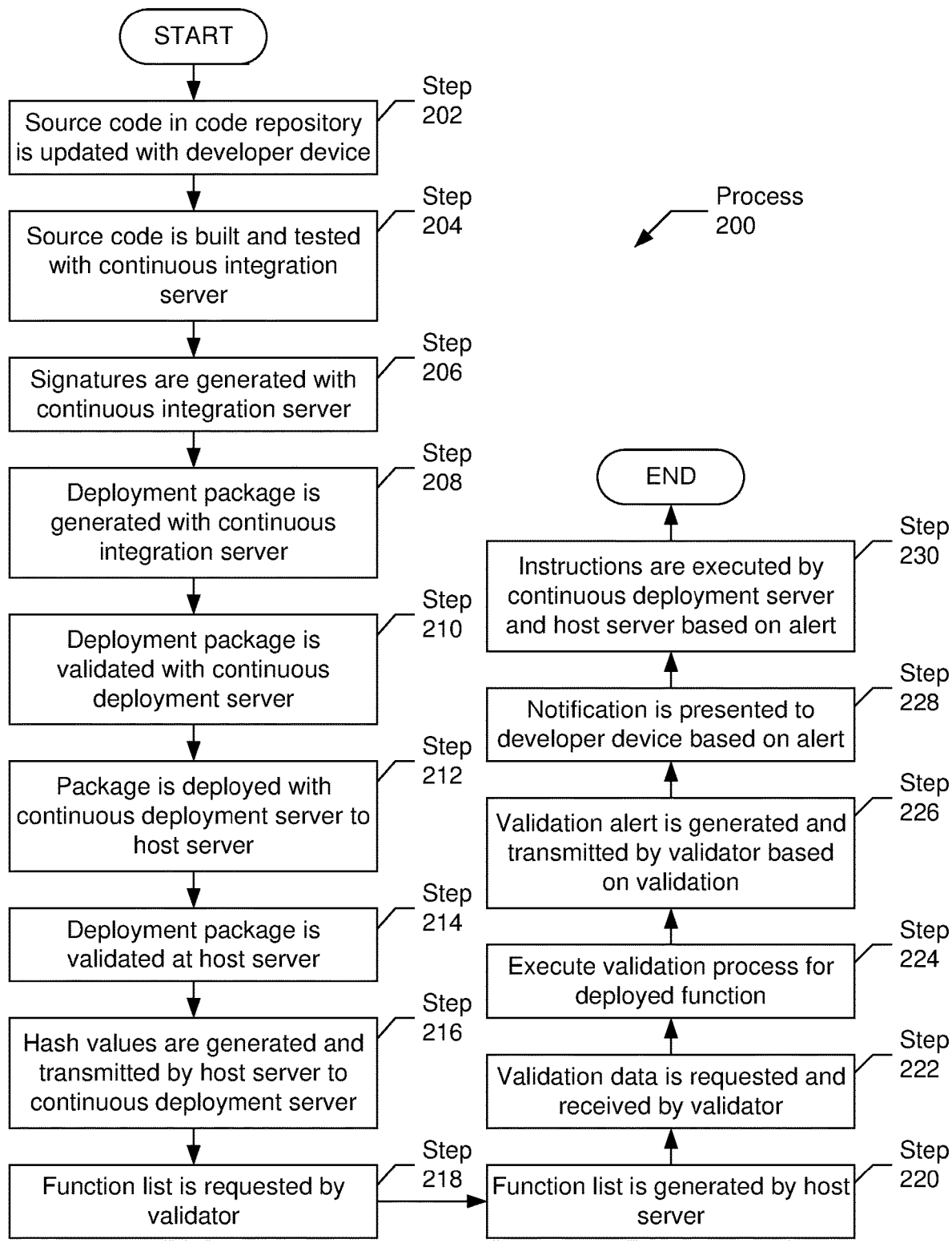
FIG. 2 shows a method for preventing serverless application package tampering in accordance with one or more embodiments of the present disclosure.

FIG. 2 shows a flowchart in accordance with one or more embodiments of the present disclosure. The flowchart of FIG. 2 depicts a process (200) for validating deployed functions. The process (200) can be implemented on one or more components of the system (100) of FIG. 1. In one or more embodiments, one or more of the steps shown in FIG. 2 may be omitted, repeated, and/or performed in a different order than the order shown in FIG. 2. Accordingly, the scope of the present disclosure should not be considered limited to the specific arrangement of steps shown in FIG. 2.

In Step 202, the source code in the code repository is updated with the developer device. In one or more embodiments, the developer uses the developer device to write, maintain, and update the source code. After updating the source code, the developer transmits the updated source code to the code repository and checks in the changes.

In Step 204, the source code is built and tested with the continuous integration server. In one or more embodiments, the continuous integration server performs an automated build process using a build tool to compile the various files within the source code as needed to form the executable files within the deployment package. After building the source code and forming the deployment package, the deployment package is tested to ensure the executable files operate as expected. In one or more embodiments, automated testing tools run one or more programs and scripts to run the executable files and compare the actual outputs to the expected outputs for each of the executable files.

In Step 206, signatures are generated by the continuous integration server. In one or more embodiments, the continuous integration server generates signatures for each of the functions to be deployed. Specifically, signatures are generated for the executable files that form the functions to be deployed. In one or more embodiments, the signature for a function is generated by hashing the executable files in the deployment package to generate an original hash value that is used as the message of the digital signature. The message and the private key are combined using a digital signature scheme to create a signed message. Types of digital signature schemes include Rivest-Shamir-Adleman (RSA) signatures, Lamport signatures, Merkle signatures, Rabin signatures, pretty good privacy (PGP) signatures, etc.

In Step 208, the deployment package is generated by the continuous integration server. In one or more embodiments, the deployment package is generated by collecting the set of executable files and metadata into an archive file that forms the deployment package.

In Step 210, the deployment package is validated by the continuous deployment server. In one or more embodiments, the continuous deployment server validates the deployment package by generating a deployment package hash value, recovering the original hash value from the digital signature generated by the continuous integration server (discussed above in Step 206), and comparing the deployment package hash value from the continuous deployment server to the original hash value from the continuous integration server. The deployment package hash value is generated by the continuous deployment server by applying a hashing algorithm to one or more of the executable files within the deployment package. In one or more embodiments, the original hash value is recovered by decrypting the digital signature using the public key. When the deployment package hash value matches the original hash value, the deployment package is validated.

In Step 212, the deployment package is deployed by the continuous deployment server to the host server. In one or more embodiments, the host server is one of a set of host servers identified by the continuous deployment server to which the deployment package is transmitted and deployed. The number of host servers to which the package is deployed identified is determined from the demand for the functionality of the deployment package as measured by the number of events received over a period of time that trigger execution of the function provided by the deployment package. The continuous deployment server generates a list of host servers that enumerates the host servers to which the package is deployed. In one or more embodiments, list of host servers is transmitted to the deployment repository for storage and access.

In Step 214, the deployment package is validated at the host server. In one or more embodiments, the deployment package is validated by the host server by: generating a deployment package hash value, recovering the original hash value, and comparing the deployment package hash value to the original hash value, similar to the validation process used by the continuous deployment server.

In Step 216, hash values are generated and transmitted by the host server to the continuous deployment server. The hash values can be generated for a set of one or more of the executable files within the deployment package. The hash values are generated in response to the deployment package being received and deployed on to the host server.

Following Step 216, the function is now deployed on the host server and is susceptible to malicious tampering, accidental tampering, or both.

In Step 218, the function list is requested by the validator. The function list request can be generated periodically and can be generated in response to event triggers. In one or more embodiments, the validator requests and receives the host server list from the deployment repository. The host server list identifies all the host servers (including the host server from Steps 212 and 214) on which the function is deployed. The validator transmits a function list request to each host server.

In Step 220, the function list is generated by the host server. In one or more embodiments, the function list of the host server is generated in response to receiving the request from the validator and after the function has been deployed to the host server. In one or more embodiments, the host server generates the function list, which includes hash values for one or more executable files from the deployment package that form the function, and then transmits the function list to the validator. The hash values in the function list are newly generated in response to the request for the function list from the validator.

In Step 222, validation data is requested and received by the validator. In one or more embodiments, the validator requests the validation data from the deployment repository.

In one or more embodiments, the deployment repository returns the digital signature generated by the continuous integration server as the validation data (as discussed in Step 206). The deployment repository can also provide the public key to be used with the digital signature.

Additional and alternative embodiments can have the deployment repository return the hash value originally generated by the host server as the validation data (as discussed in Step 216). The originally generated hash value was generated by the host server in response to the function being deployed to the host server, was transmitted to the continuous deployment server after being generated by the host server, and was then transmitted to the deployment repository by the continuous deployment server.

In Step 224, a validation process is executed for the deployed function. In one or more embodiments, the validation process is executed by the validator for each host server identified in the host server list to which the function is deployed.

In one or more embodiments, the digital signature is used to validate the deployed function by the validator. The deployed function is validated by generating a deployed function hash value, recovering the original hash value from the digital signature, and comparing the deployed function hash value to the original hash value. The deployed function hash value is generated by either the host server (and is present in the function list) or by the validator (from one or more hash values in the function list). In one or more embodiments, the host server generates the deployed function hash value by generating the function list and hashing one or more hash values from the function list. The deployed function hash value is then included with the function list that is returned to the validator. In one or more embodiments, the validator generates the deployed function hash value by hashing one or more hash values from the function list returned from the host server.

In one or more embodiments, the original hash value is recovered by decrypting the digital signature using the public key. When the deployed function hash value matches the original hash value, the deployed function is validated.

In additional and alternative embodiments, the hash value is used to validate the deployed function by the validator. The deployed function is validated by: generating a deployed function hash value (e.g., using the function list generated in Step 220), retrieving the original hash value from the deployment repository (from Step 216), and comparing the deployed function hash value to the original hash value. The deployed function hash value is generated by either the host server (and present in the function list of Step 220) or the validator from the function list, as described above.

In Step 226, a validation alert is generated and transmitted by the validator based on the validation. In one or more embodiments, the validation alert is generated in response to the validation process failing to verify the function list with the validation data. For example, the validation process will fail when the deployed function hash value does not match, i.e., a mismatch, the original hash value that is either recovered from the digital signature or retrieved from the deployment repository. The mismatch is an indication that the deployed function has been tampered with.

In Step 228, a notification is presented to the developer device based on the validation alert. In one or more embodiments, the notification is presented by updating a web page that is displayed by the developer device to include an identification of the functions and host servers that did not pass the validation process.

In Step 230, instructions are executed by the continuous deployment server and the host server based on the alert. In one or more embodiments, the instructions are generated by the validator. The instructions include instructions for the host server to halt execution of the function and include instructions for the continuous deployment server to redeploy the deployment package. The instructions for the host server to halt execution can be transmitted by the validator to the host server and executed by the host server in response to the deployed function failing the validation process. The instructions for the continuous deployment server to redeploy the deployed function from the deployment package can be transmitted by the validator to the continuous deployment server and executed by the continuous deployment server in response to the deployed function failing the validation process.

FIGS. 3A through 3H show a sequence diagram in accordance with one or more embodiments of the present disclosure. The sequence diagram of FIGS. 3A through 3H depicts a sequence of events of a process for detecting and/or preventing serverless application package tampering. The process may be performed by one or more devices and components (302, 304, 306, 308, 310, 312, 314), which correspond to the devices of the system (100) discussed above in reference to FIG. 1. In one or more embodiments, one or more of the steps and events shown in FIGS. 3A through 3H may be omitted, repeated, and/or performed in a different order than the order shown in FIGS. 3A through 3H. Accordingly, the scope of the present disclosure should not be considered limited to the specific arrangement shown in FIGS. 3A through 3H.

Figure 3A:
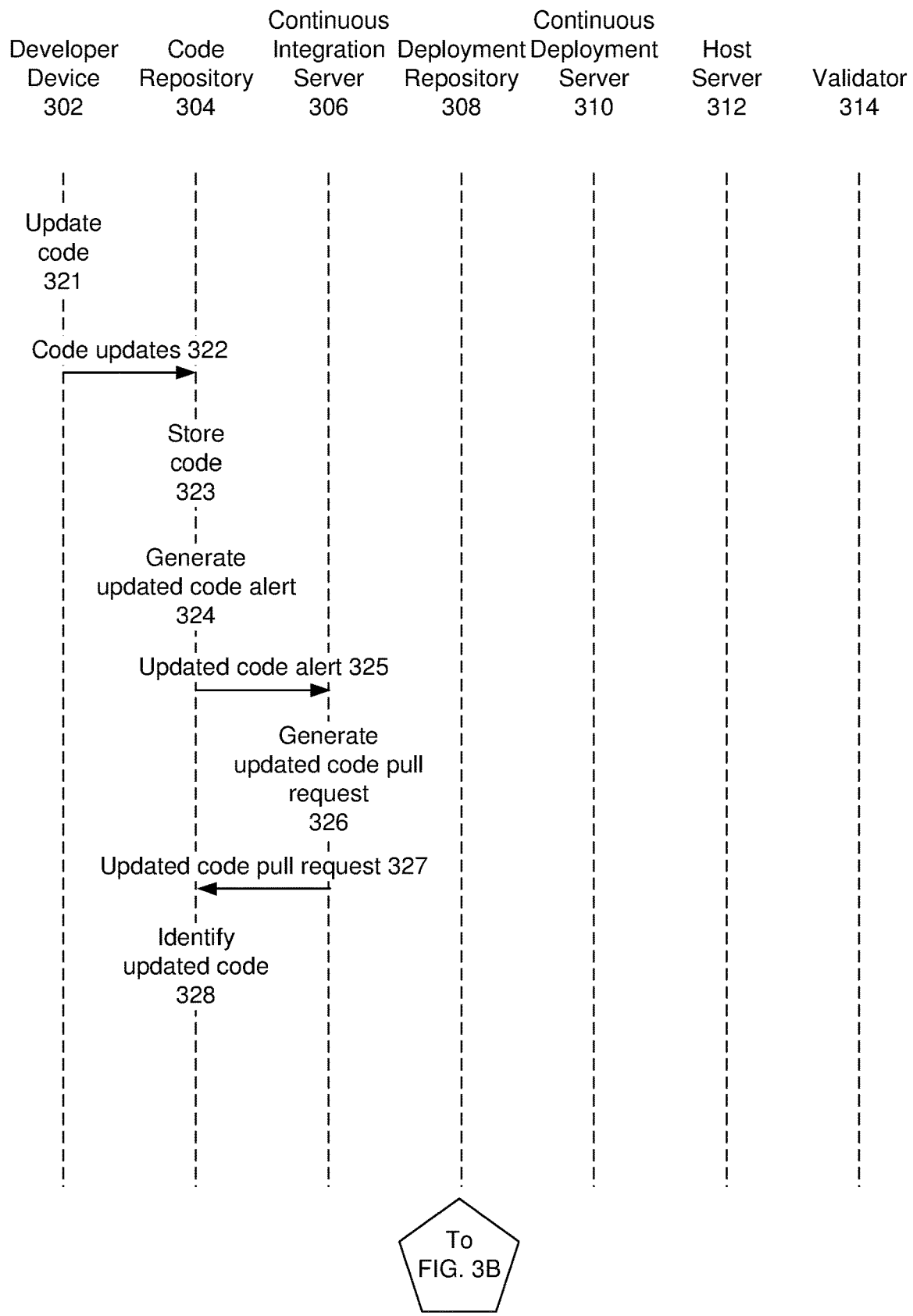
FIGS. 3A, 3B, 3C, 3D, 3E, 3F, 3G, and 3H show an example in accordance with one or more embodiments of the present disclosure.

Referring to FIG. 3A, in Step 321, the source code is updated with the developer device (302). In one or more embodiments, the developer uses an integrated development environment (IDE) that includes a source code editor, build automation tools, and a debugger to generate the updates to the source code.

In Step 322, the code updates are transmitted from the developer device (302) and received by the code repository (304). In one or more embodiments, transmission is over a network using transmission control protocol/Internet Protocol (TCP/IP).

In Step 323, the code updates are stored. In one or more embodiments, the code repository (304) includes a database that stores the code updates from the developer device.

In Step 324, an updated code alert is generated. In one or more embodiments, the updated code alert is generated by the code repository after determining that the contents of the files of the source code have been changed in the updated code.

In Step 325, the updated code alert is transmitted from the code repository (304) to the continuous integration server (306). In one or more embodiments, the alert is transmitted in response to determining that there is a change to the contents of the source code.

In Step 326, an updated code pull request is generated. In one or more embodiments, the continuous integration server generates the pull request in response to receiving the updated code alert and determining that one or more executable files need to be rebuilt or retested. In one or more embodiments, the continuous integration server (306) identifies specific files from the source code that are needed to rebuild and retest the executable files and includes the identified files in the pull request.

In Step 327, the updated code pull request is transmitted. In one or more embodiments, the continuous integration server (306) transmits the updated code pull request in response to determining that an executable file needs to be rebuilt or retested. The code repository (304) receives the pull request from the continuous integration server (306).

In Step 328, the updated code is identified. In one or more embodiments the code repository identifies the updated code requested by the continuous integration server (306) from the list of files provided in the pull request.

Figure 3B:
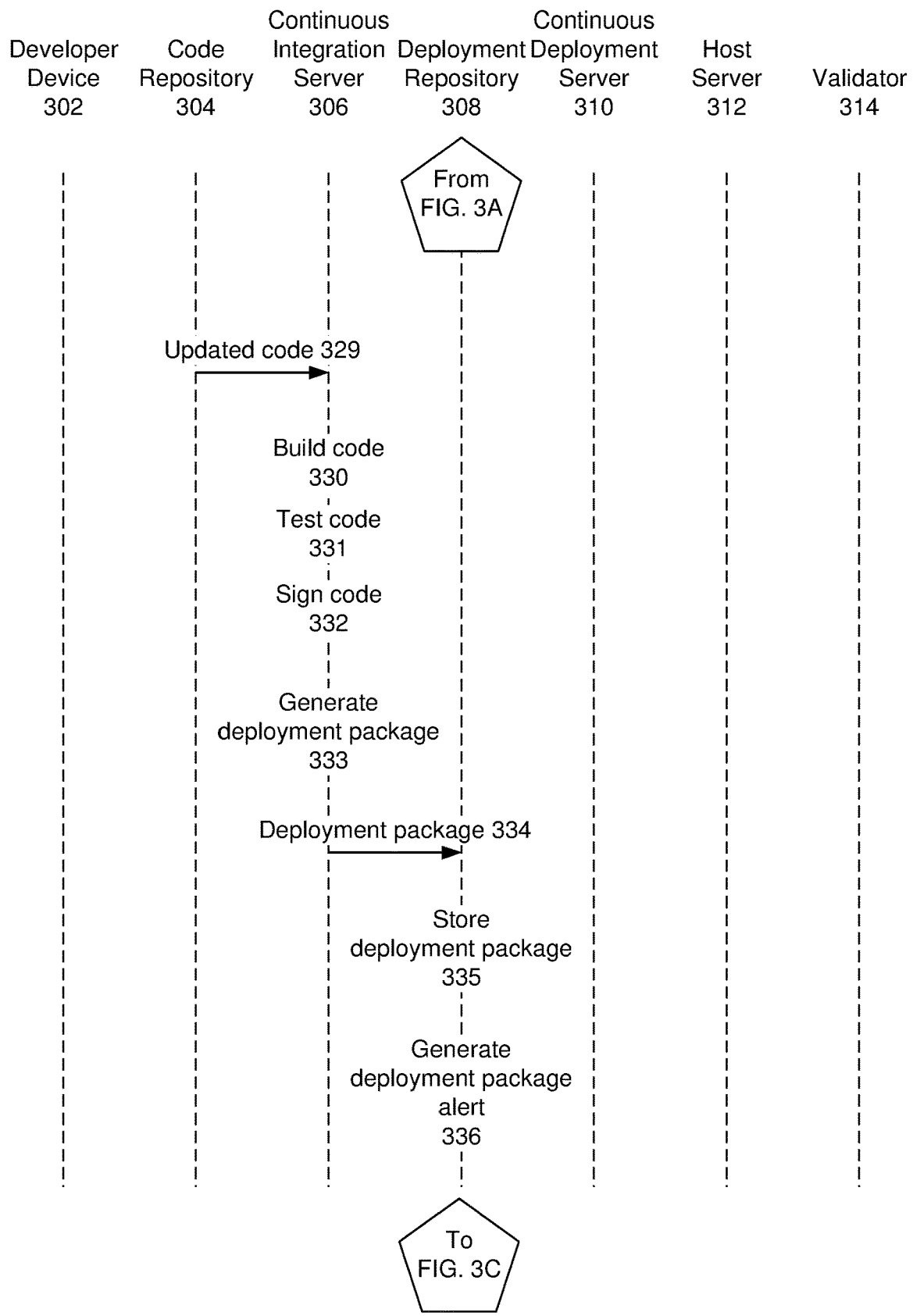

Referring to FIG. 3B, in Step 329, the updated code is transmitted and received. In one or more embodiments, the code repository (304) transmits the updated code and the continuous integration server (306) receives the updated code.

In Step 330, the updated source code is built. In one or more embodiments, the continuous integration server (306) builds the source code with the updated code received from the code repository (304) using one or more compilers, assemblers, and linkers to generate updated executable files. If the build process does not succeed, the sequence ends.

In Step 331, the executable files are tested. In one or more embodiments, the executable files that are tested include the updated executable files and the continuous integration server (306) tests the executable files using one or more scripts and programs. If the testing process does not succeed, the sequence ends.

In Step 332, the tested files are signed. In one or more embodiments, the continuous integration server (306) signs the tested files using a private key that was provided by the developer with the developer device (302). In one or more embodiments, the signing process involves hashing the tested files to generate a hash value and encrypting the hash value using the private key to generate a digital signature.

In Step 333, a deployment package is generated. In one or more embodiments, the continuous integration server (306) generates the deployment package by storing the tested files, metadata, and the digital signature into an archive file. The deployment package is similar to the deployment package (118), discussed above in reference to FIG. 1.

In Step 334, the deployment package is transmitted and received. In one or more embodiments, the continuous integration server (306) transmits the deployment package and the deployment repository (308) receives the deployment package.

In Step 335, the deployment package is stored. In one or more embodiments, the deployment repository (308) stores the deployment package into a database.

Following Step 335, the stored deployment package is susceptible to malicious tampering, accidental tampering, or both.

In Step 336, a deployment package alert is generated. It one or more embodiments, the deployment repository (308) generates the deployment package alert in response to receiving the deployment package from the continuous integration server (306).

Figure 3C:
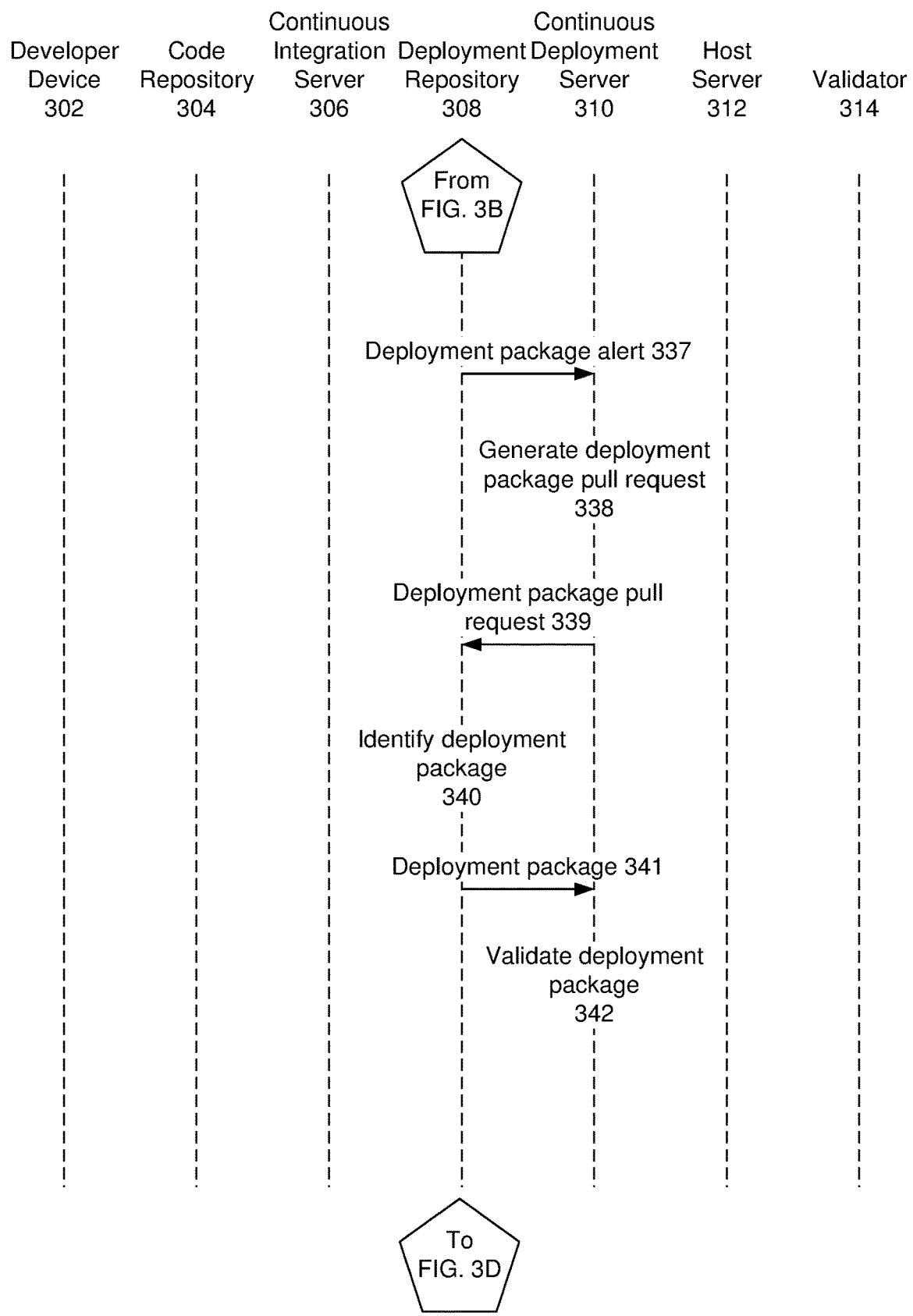

Referring to FIG. 3C, in Step 337, deployment package alert is transmitted and received. In one or more embodiments, the deployment repository (308) transmits the deployment package alert in response to receiving the deployment package from the continuous integration server (306). The continuous deployment server (310) receives the deployment package alert.

In Step 338, a deployment package pull request is generated by the continuous deployment server (310). In one or more embodiments, the continuous deployment server (310) generates the deployment package pull request in response to receiving the deployment package alert from the deployment repository (308). The deployment package pull request includes an identifier that identifies the deployment package that has been updated.

In Step 339, the deployment package pull request is transmitted and received. In one or more embodiments, the continuous deployment server (310) transmits the deployment package pull request in response to receiving the deployment package alert from the deployment repository (308).

In Step 340, the deployment package is identified. In one or more embodiments, the deployment repository (308) identifies the deployment package using an identifier that was included in the deployment package pull request from the continuous deployment server (310).

In Step 341, the deployment package is transmitted and received. In one or more embodiments, the deployment repository (308) transmits the deployment package in response to the deployment package pull request and the continuous deployment server (310) receives the deployment package.

In Step 342, the updated deployment package is validated. In one or more embodiments, the continuous deployment server (310) validates the updated deployment package by decrypting the digital signature in the deployment package with the public key that is associated with and was provided by the developer to recover the hash value generated by the continuous integration server (306). The continuous deployment server (310) hashes the executable files of the deployment package to generate a hash value that is compared with the recovered hash value. If the generated hash value does not match the recovered hash value, then the deployment package may have been tampered with and the continuous deployment server (310) will not deploy the deployment package to the host server (312).

Figure 3D:
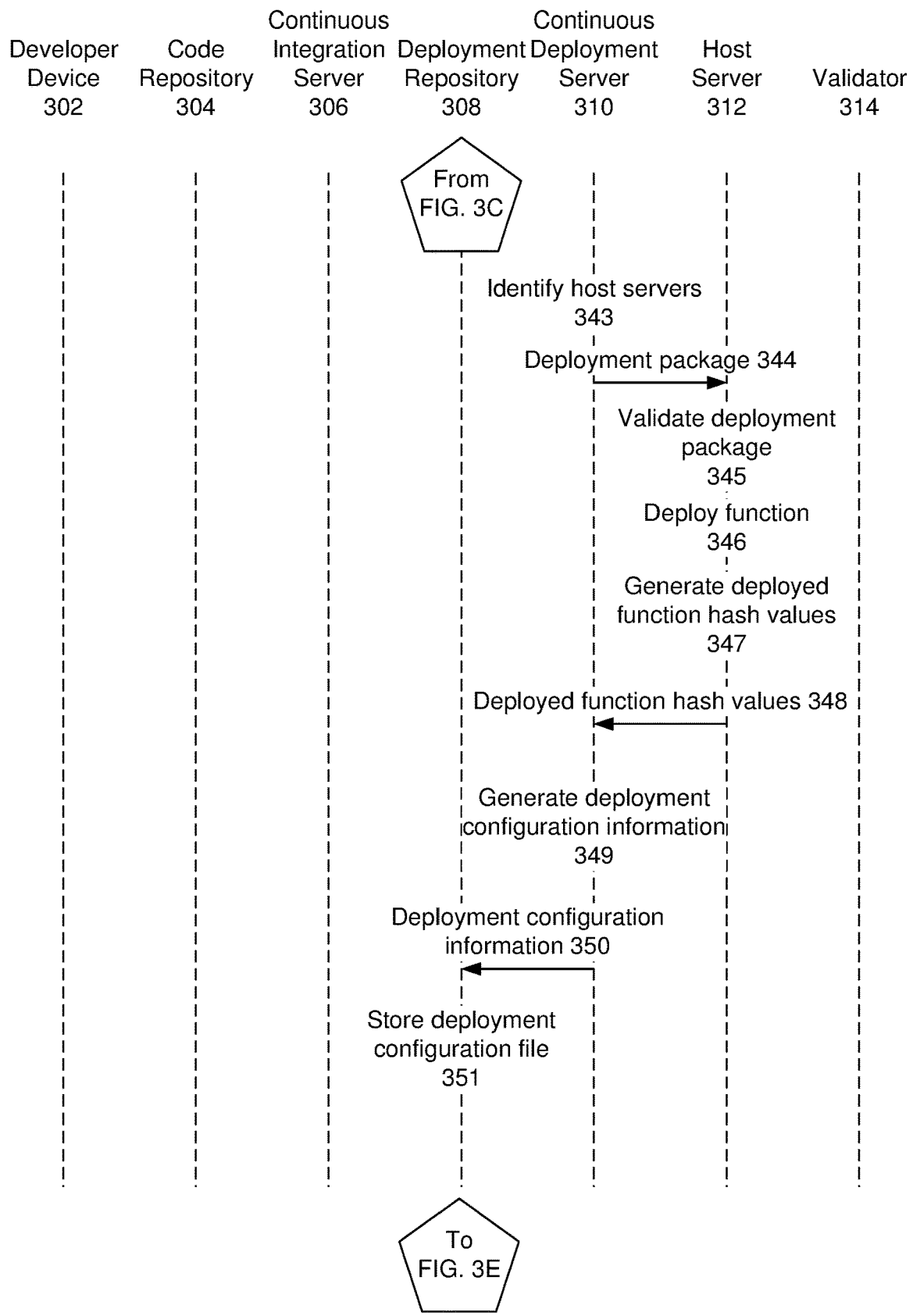

Referring to FIG. 3D, in Step 343, a set of host servers are identified/selected for deployment of the deployment package. In one or more embodiments, the continuous deployment server (310) identifies the host server (312) as one of a set of host servers to which the deployment package will be deployed.

In Step 344, the deployment package is transmitted from the continuous deployment to the host server (312). In one or more embodiments, the continuous deployment server (310) transmits the deployment package to the host server (312) (and the other identified/selected servers) in response to validating the deployment package received from the deployment repository (308).

In Step 345, the deployment package is validated by the host server (312). In one or more embodiments, the validation process validates the deployment package using the digital signature from the deployment package with the public key provided by the developer. The validation process used by the host server (312) is similar to the validation process used by the continuous deployment server (310) in Step 342.

In Step 346, the function is deployed. In one or more embodiments, the host server (312) deploys the function by installing the deployment package and any dependencies needed by the programs and executable files within the deployment package.

In Step 347, the deployed function hash value is generated. In one or more embodiments, the host server (312) hashes one or more of the executable files installed from the deployment package and the directory structure for the installed executable files to generate the deployed function hash value.

In Step 348, the deployed function hash value is transmitted and received. In one or more embodiments, host server (312) transmits the deployed function hash value and the continuous deployment server (310) receives the deployed function hash value.

In Step 349, deployment configuration information is generated by the continuous deployment server (310). In one or more embodiments, the continuous deployment server (310) generates the deployment configuration information by collecting the deployed function hash value from each host server that deployed the function, generating the host server list with an identifier for each host server that deployed the function, and retrieving an identifier for the deployment package.

In Step 350, the deployment configuration information is transmitted and received. In one or more embodiments, the continuous deployment server (310) transmits the deployment configuration information in response to receiving the deployed function hash values from the host servers that deployed the function. The deployment repository (308) receives the deployment configuration information from the continuous deployment server (310).

In Step 351, the deployment configuration information is stored. In one or more embodiments, deployment repository (308) stores deployment configuration information in a database. For example, the deployed function hash values from the deployment configuration information are stored in a catalog of the deployment package. The host server list from the deployment configuration information is stored to the deployment package.

Following Step 351, the function is deployed to the host server (312) and is susceptible to malicious tampering, accidental tampering, or both.

Figure 3E:
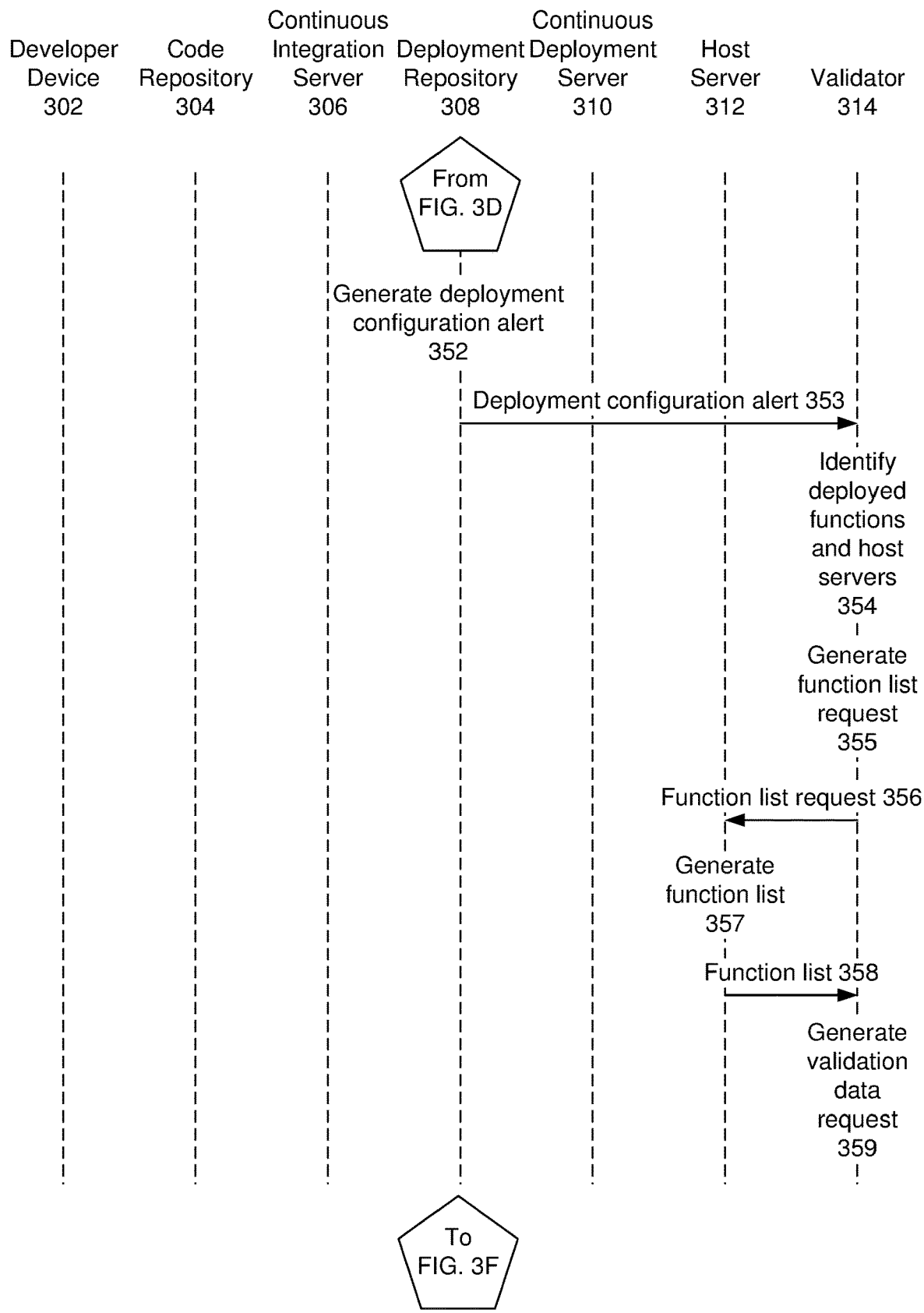

Referring to FIG. 3E, in Step 352, the deployment configuration alert is generated. In one or more embodiments, the deployment repository (308) generates the deployment configuration alert in response to receiving the deployment configuration information from the continuous deployment server (310). In one or more embodiments, the deployment configuration information is included with the deployment configuration alert.

In Step 353, deployment configuration alert is transmitted and received. In one or more embodiments, deployment repository (308) transmits the deployment configuration alert to the validator (314) in response to receiving the deployment configuration information from the continuous deployment server (310) and determining that the deployment configuration has changed.

In Step 354, each function and each host server is identified. In one or more embodiments, the validator (314) identifies the deployed function and the host servers that have deployed the function from the deployment configuration alert (which, as discussed above, includes the deployment configuration information). The validator can operate for one or more functions, with each function associated with an individual deployment package.

In Step 355, the function list request is generated. In one or more embodiments, the validator (314) generates a function list request for each host server to which the function is deployed.

In Step 356, the function list request is transmitted and received. In one or more embodiments, the validator (314) transmits the function list request to the host server (312) in response to determining that the deployment configuration has changed. Additional and alternative embodiments can have the validator (314) periodically poll each host server monthly, weekly, daily, hourly, etc.

In Step 357, the function list is generated. In one or more embodiments, host server (312) generates the function list in response to receiving the function list request from the validator (314). The function list includes a hash value for the deployed function that should be the same as the deployed function hash value that was previously generated.

In Step 358, the function list is returned. In one or more embodiments, the host server (312) transmits the function list to the validator (314) in response to receiving the function list request and generating the function list. The validator (314) receives the function list from the host server (312).

In Step 359, the validation data request is generated. In one or more embodiments, the validation data request is generated by the validator (314).

Figure 3F:
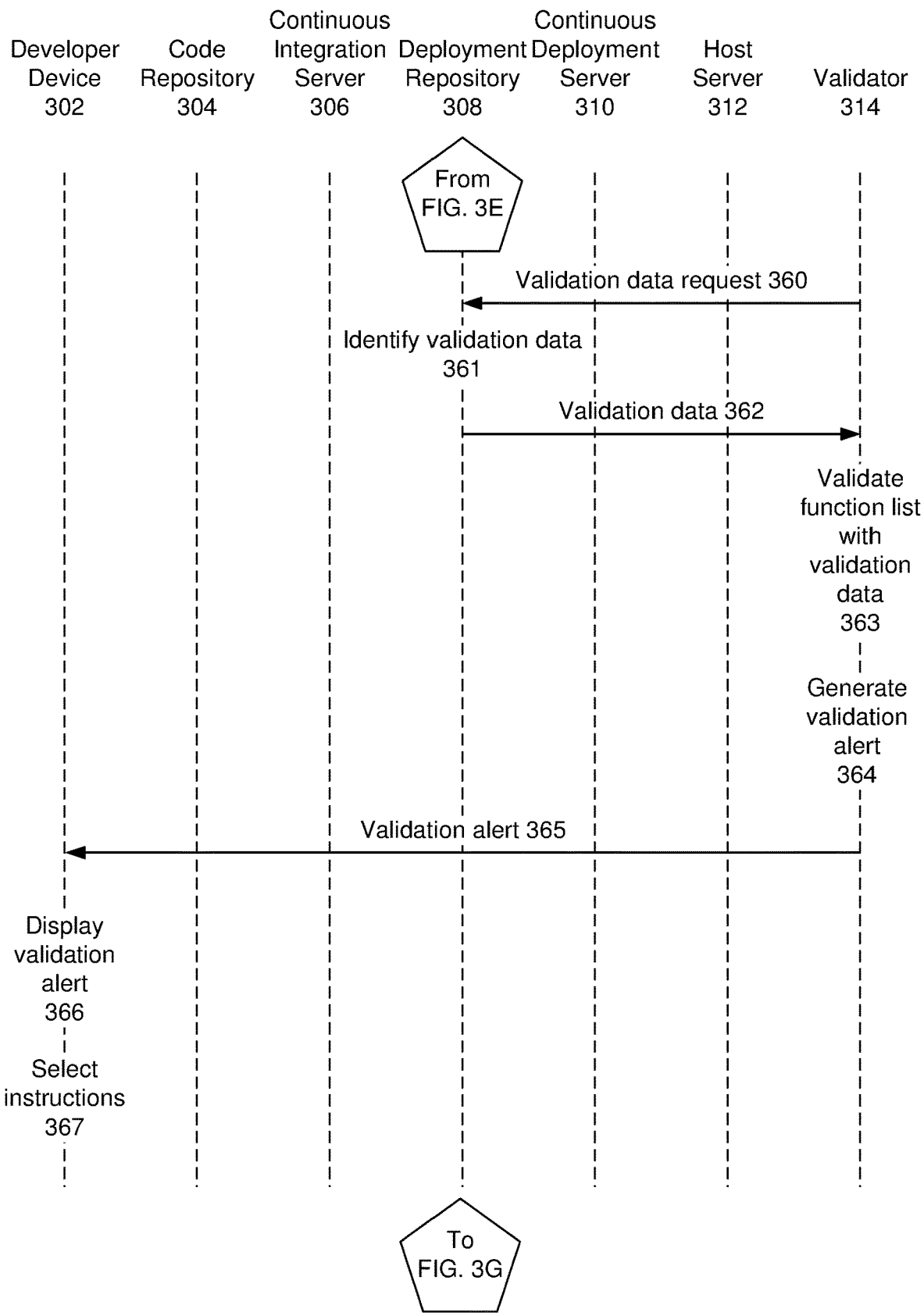

Referring to FIG. 3F, in Step 360, the validation data request is transmitted and received. In one or more embodiments, the validator (314) transmits the validation data request to the deployment repository (308), which receives the validation data request.

In Step 361, validation data is identified. In one or more embodiments, the deployment repository (308) identifies the validation data in the catalog for the deployment package that is specified in the validation data request and identifies the function deployed on the host server (312). In one or more embodiments, validation data includes the digital signature generated by the continuous integration server. Additional and alternative embodiments can have the validation data include the deployed function hash value generated by the host server instead of the digital signature. Additional embodiments can have the validation data include a combination of both the digital signature and the deployed function hash value.

In Step 362, the validation data is transmitted and received. In one or more embodiments, the deployment repository (308) transmits the validation data to the validator (314) and the validator (314) receives the validation data from the deployment repository (308).

In Step 363, the function list is validated with the validation data. In one or more embodiments, the function list received from the host server (312) includes a hash value for the deployed function that was generated in response to a request from the validator (314), which is compared to the validation data. When the validation data is a hash value, the comparison is a direct comparison of the hash values. When the validation data is a digital signature, the digital signature is decrypted with the public key of the developer to recover the original hash value, which is compared to the hash value from the function list. When the hash values match the validation successful.

In Step 364, the validation alert is generated. In one or more embodiments, the validator (314) generates the validation alert in response to the validation process. The validation alert identifies whether the validation process for the deployed function on the host server (312) was successful.

In Step 365, the validation alert is transmitted and received. In one or or embodiments, the validator transmits the validation alert to the developer device (302) and can be in response to a failure to validate the deployed function, indicating that the deployed function has been tampered with.

In Step 366, the validation alert is displayed. In one or more embodiments, the validation alert is displayed by updating a view of a web page or application on the developer device (302).

In Step 367, instructions are selected. In one or more embodiments, the developer selects from a set of instructions that are responsive to the validation alert. When the validation alert identifies that the deployed function was successfully validated, the instruction can include an acknowledgement that the validation was successful. When the validation alert indicates that the deployed function was not successfully validated, the instruction can include options for halting the execution of the deployed function, redeploying the deployed function, and rebuilding the deployment package from the source code. Additional and alternative embodiments can have the halting, redeployment, and rebuilding performed automatically by the system without instructions from the developer device (302).

Figure 3G:
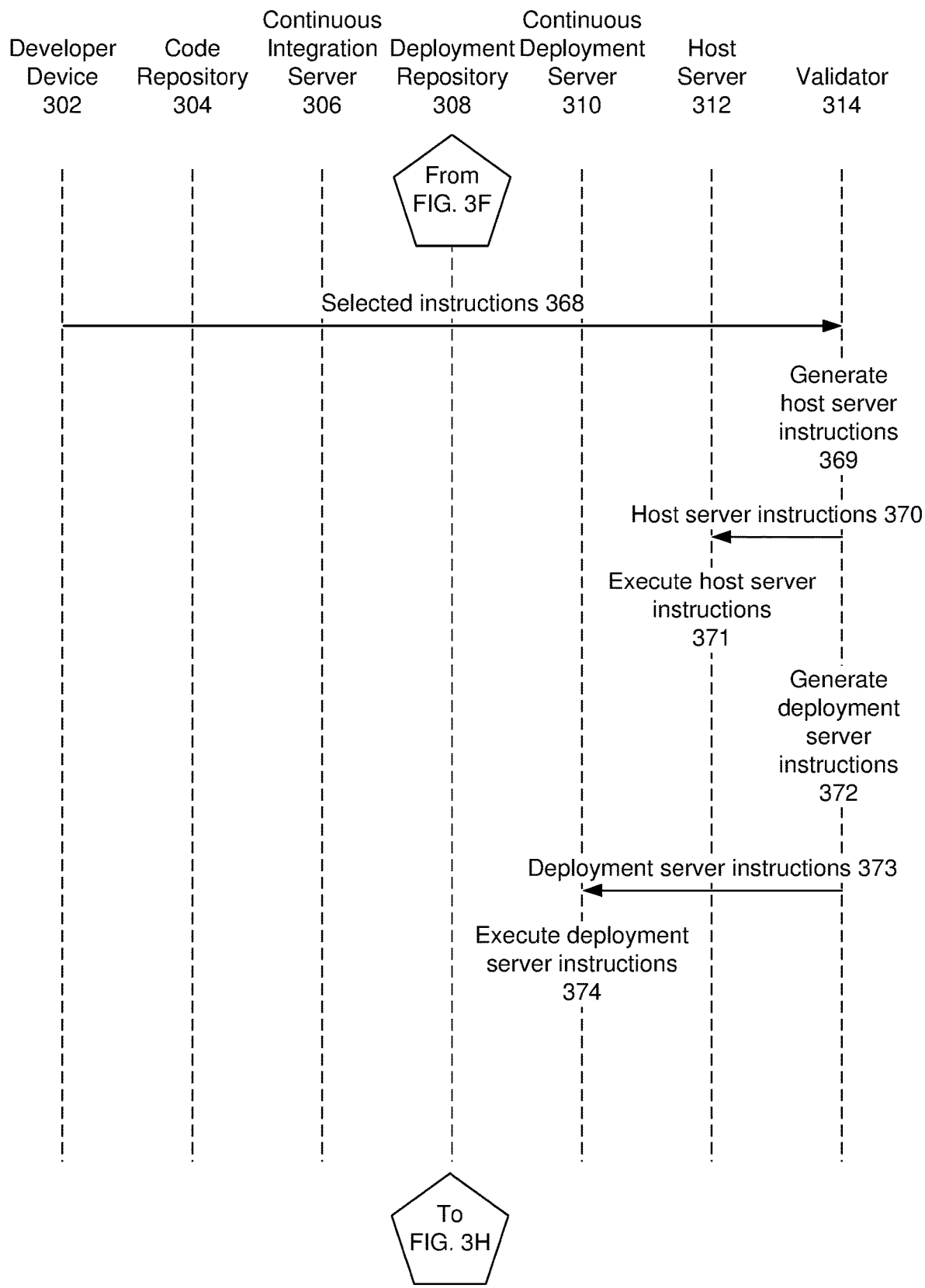

Referring to FIG. 3G, in step 368, selected instructions are transmitted and received. In one or more embodiments, the selected instructions are transmitted from the developer device (302) to the validator (314). Additional and alternative embodiments can have the instructions for halting execution of the deployed function be transmitted directly to the host server (312) and the instructions for redeploying the function be transmitted directly to the continuous deployment server (310).

In Step 369, the host server instructions are generated. In one or more embodiments, the validator (314) generates the host server instructions in response to and based on the selected instructions received from the developer device (302). In additional or alternative embodiments, the validator (314) can generate the host server instructions automatically in response to the validation process (Step 363) without receiving the selected instructions from the developer device (302).

In Step 370, the host server instructions are transmitted to and received by the host server (312). In one or more embodiments, the validator (314) transmits the host server instructions in response to receiving the selected instructions from the developer device (302).

In Step 371, the host server instructions are executed. In one or more embodiments, the host server instructions halt the execution of the deployed function on the host server.

In Step 372, deployment server instructions are generated. In one or more embodiments, the validator (314) generates the deployment server instructions in response to and based on the selected instructions received from the developer device (302). In additional or alternative embodiments, the validator (314) generates the deployment server instructions automatically in response to the validation process (Step 363) without receiving the selected instructions from the developer device (302).

In Step 373, the deployment server instructions are transmitted to and received by the continuous deployment server (310). In one or more embodiments, the validator (314) transmits the deployment server instructions in response to receiving the selected instructions from the developer device (302).

In Step 374, the deployment server instructions are executed. In one or more embodiments, the deployment server instructions cause the continuous deployment server (310) to redeploy the function to the host server (312), which can involve repeating at least Steps 338 through 351 of the sequence.

Figure 3H:
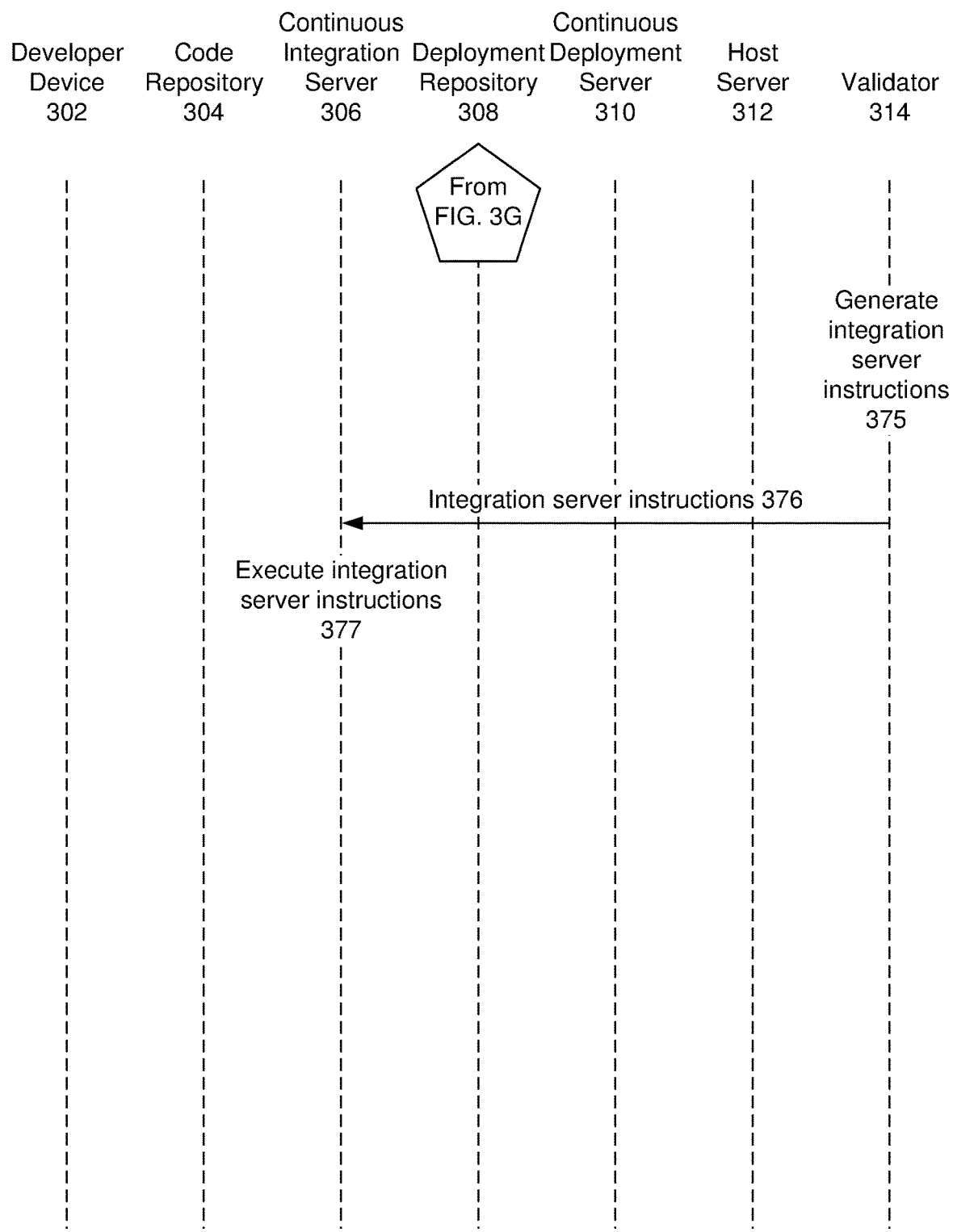

Referring to FIG. 3H, in Step 375, integration server instructions are generated. In one or more embodiments, the validator (314) generates the integration server instructions in response to and based on the selected instructions received from the developer device (302). In additional or alternative embodiments, the validator (314) generates the integration server instructions automatically in response to the validation process (Step 363) without receiving the selected instructions from the developer device (302).

In Step 376, the integration server instructions are transmitted to and received by the continuous integration server (306). In one or more embodiments, the validator (314) transmits the integration server instructions in response to receiving the selected instructions from the developer device (302).

In Step 377, the integration server instructions are executed. In one or more embodiments, the integration server instructions cause the continuous integration server (306) to rebuild the deployment package for the function from the source code, which can involve repeating at least Steps 329 through 337 of the sequence.

Figure 4A:
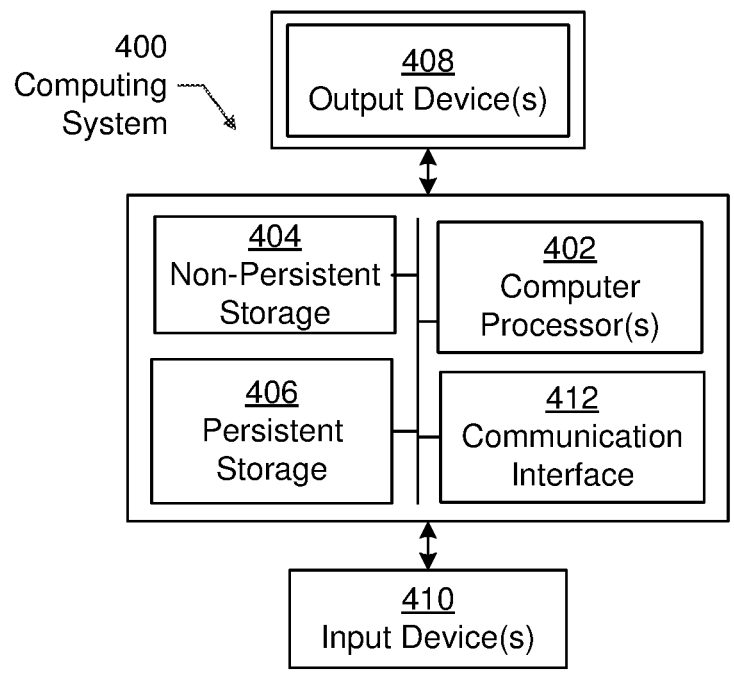
FIGS. 4A and 4B show a computing system in accordance with one or more embodiments of the invention.

Embodiments of the invention may be implemented on a computing system. Any combination of mobile, desktop, server, router, switch, embedded device, or other types of hardware may be used. For example, as shown in FIG. 4A, the computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), and numerous other elements and functionalities.

The computer processor(s) (402) may be an integrated circuit for processing instructions. For example, the computer processor(s) may be one or more cores or micro-cores of a processor. The computing system (400) may also include one or more input devices (410), such as a touchscreen, keyboard, mouse, microphone, touchpad, electronic pen, or any other type of input device.

The communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

Further, the computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 4B:
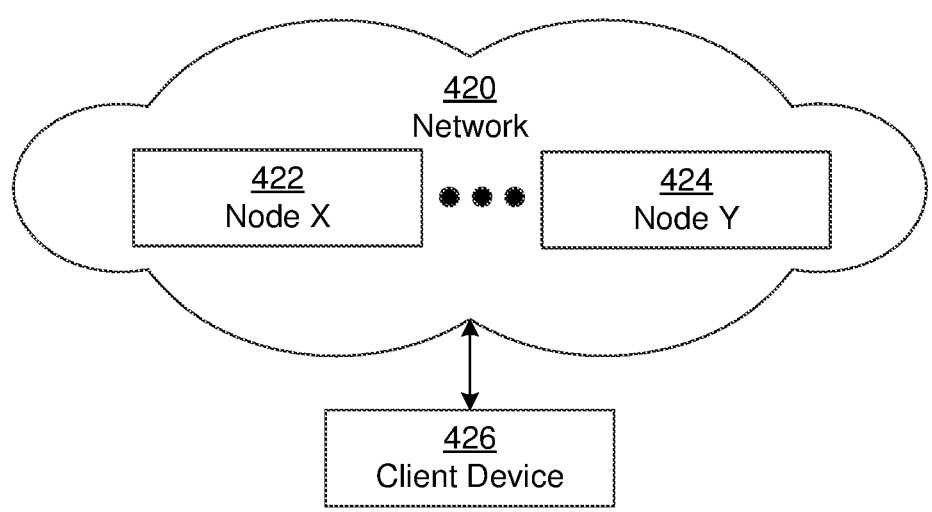

The computing system (400) in FIG. 4A may be connected to or be a part of a network. For example, as shown in FIG. 4B, the network (420) may include multiple nodes (e.g., node X (422), node Y (424)). Each node may correspond to a computing system, such as the computing system shown in FIG. 4A, or a group of nodes combined may correspond to the computing system shown in FIG. 4A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (400) may be located at a remote location and connected to the other elements over a network.

Although not shown in FIG. 4B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (422), node Y (424)) in the network (420) may be configured to provide services for a client device (426). For example, the nodes may be part of a cloud computing system. The nodes may include functionality to receive requests from the client device (426) and transmit responses to the client device (426). The client device (426) may be a computing system, such as the computing system shown in FIG. 4A. Further, the client device (426) may include and/or perform all or a portion of one or more embodiments of the invention.

The computing system or group of computing systems described in FIGS. 4A and 4B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 4A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 4A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 4A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 4A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions present only a few examples of functions performed by the computing system of FIG. 4A and the nodes and/or client device in FIG. 4B. Other functions may be performed using one or more embodiments of the invention.

While the various steps in the example flowcharts described above are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
receiving, from a host server in a serverless computing architecture, a list of functions comprising a deployed function on the host server,
wherein the functions execute within a function as a service (FaaS) platform;
receiving validation data for each of the functions, wherein:
the validation data comprises a first hash value for the deployed function,
the first hash value is generated by the host server in response to the deployed function being deployed on the host server, and
the first hash value is transmitted by the host server to a continuous deployment server in response to the deployed function being deployed on the host server;
sending a request for the list of functions to the host server, wherein:
the list of functions includes a second hash value for the deployed function, and
the second hash value is generated by the host server in response to receiving the request for the list of functions after the function is deployed;
executing a validation process for each of the functions using the validation data, wherein the validation process for the deployed function comprises comparing the first hash value with the second hash value; and
generating a validation alert in response to the deployed function failing the validation process.

2. The method of claim 1, further comprising:
identifying each host server to which each function is deployed in the serverless computing architecture; and
validating each function for each host server.

3. The method of claim 1, further comprising:
halting, in response to the deployed function failing the validation process, execution of the deployed function on the host server by:
generating a host server instruction to halt execution of the deployed function; and
sending the host server instruction to the host server for execution.

4. The method of claim 1, further comprising:
redeploying, in response to the deployed function failing the validation process, the deployed function by:
generating a continuous deployment server instruction to redeploy the deployed function; and
sending the continuous deployment server instruction to the continuous deployment server for execution.

5. The method of claim 1, further comprising:
sending a request for the list of functions to the host server,
wherein the validation data comprises a digital signature generated with a third hash value,
wherein the third hash value is generated by a continuous integration server that generated a deployment package from which the deployed function was deployed, and
wherein the validation process for the deployed function further comprises verifying the second hash value using the digital signature.

6. A system, comprising:
a computer processor;
a memory;
a set of instructions in the memory that when executed by the computer processor cause the computer processor to perform:
receiving, from a host server in a serverless computing architecture, a list of functions comprising a deployed function on the host server,
wherein the functions execute within a function as a service (FaaS) platform;
receiving validation data for each of the functions, wherein:
the validation data comprises a first hash value for the deployed function,
the first hash value is generated by the host server in response to the deployed function being deployed on the host server, and
the first hash value is transmitted by the host server to a continuous deployment server in response to the deployed function being deployed on the host server;
sending a request for the list of functions to the host server, wherein:
the list of functions includes a second hash value for the deployed function, and the second hash value is generated by the host server in response to receiving the request for the list of functions after the function is deployed;

executing a validation process for each of the functions using the validation data, wherein the validation process for the deployed function comprises comparing the first hash value with the second hash value; and generating a validation alert in response to the deployed function failing the validation process.

7. The system of claim 6, wherein the set of instructions further cause the computer processor to perform:

identifying each host server to which each function is deployed in the serverless computing architecture; and validating each function for each host server.

8. The system of claim 6, wherein the set of instructions further cause the computer processor to perform:

halting, in response to the deployed function failing the validation process, execution of the deployed function on the host server by:

generating a host server instruction to halt execution of the deployed function; and sending the host server instruction to the host server for execution.

9. The system of claim 6, wherein the set of instructions further cause the computer processor to perform:

redeploying, in response to the deployed function failing the validation process, the deployed function by:

generating a continuous deployment server instruction to redeploy the deployed function; and sending the continuous deployment server instruction to the continuous deployment server for execution.

10. The system of claim 6, wherein the set of instructions further cause the computer processor to perform:

sending a request for the list of functions to the host server, wherein the validation data comprises a digital signature generated with a third hash value, wherein the third hash value is generated by a continuous integration server that generated a deployment package from which the deployed function was deployed, and wherein the validation process for the deployed function further comprises verifying the second hash value using the digital signature.

11. A non-transitory computer readable medium (CRM) comprising computer readable program code that when executed by a computer processor causes the computer processor to perform:

receiving, from a host server in a serverless computing architecture, a list of functions comprising a deployed function on the host server, wherein the functions execute within a function as a service (FaaS) platform;

receiving validation data for each of the functions, wherein:

the validation data comprises a first hash value for the deployed function, the first hash value is generated by the host server in response to the deployed function being deployed on the host server, and the first hash value is transmitted by the host server to a continuous deployment server in response to the deployed function being deployed on the host server;

sending a request for the list of functions to the host server, wherein:

the list of functions includes a second hash value for the deployed function, and the second hash value is generated by the host server in response to receiving the request for the list of functions after the function is deployed;

executing a validation process for each of the functions using the validation data, wherein the validation process for the deployed function comprises comparing the first hash value with the second hash value; and generating a validation alert in response to the deployed function failing the validation process.

12. The non-transitory CRM of claim 11, wherein the computer readable program code further causes the computer processor to perform:

identifying each host server to which each function is deployed in the serverless computing architecture; and validating each function for each host server.

13. The non-transitory CRM of claim 11, wherein the computer readable program code further causes the computer processor to perform:

halting, in response to the deployed function failing the validation process, execution of the deployed function on the host server by:

generating a host server instruction to halt execution of the deployed function; and sending the host server instruction to the host server for execution.

14. The non-transitory CRM of claim 11, wherein the computer readable program code further causes the computer processor to perform:

redeploying, in response to the deployed function failing the validation process, the deployed function by:

generating a continuous deployment server instruction to redeploy the deployed function; and sending the continuous deployment server instruction to the continuous deployment server for execution.

15. The non-transitory CRM of claim 11, further comprising wherein the computer readable program code further causes the computer processor to perform:

sending a request for the list of functions to the host server, wherein the validation data comprises a digital signature generated with a third hash value, wherein the third hash value is generated by a continuous integration server that generated a deployment package from which the deployed function was deployed, and wherein the validation process for the deployed function further comprises verifying the second hash value using the digital signature.

* * * * *